3,150,123
AZO DYESTUFFS

Edgar Enders, Cologne-Flittard, Rolf Pütter, Dusseldorf, and Alfons Dorlars, Leverkusen, Germany, assignors to Farbenfabriken Bayer Aktiengesellschaft, Leverkusen, Germany, a corporation of Germany
No Drawing. Filed Apr. 7, 1961, Ser. No. 101,380
Claims priority, application Germany April 16, 1960
8 Claims. (Cl. 260—198)

The present invention relates to new azo dyestuffs; more particularly it relates to azo dyestuffs of the formula

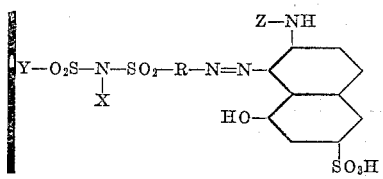

In this formula R denotes a radical of the benzene series in which the substituents —$SO_2$— and —N=N— are linked with one another in the o-position, X denotes a carbocyclic aryl or cycloalkyl radical, Y a carbocyclic aryl radical, and Z denotes hydrogen, a lower alkyl, a carbocyclic aryl or aralkyl radical.

The azo dyestuffs are obtained by coupling in an acid medium a diazotised aromatic amine of the general formula

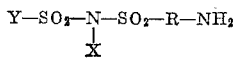

wherein R, X and Y have the above-indicated significance, with a compound of the general formula

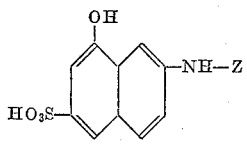

wherein Z has the meaning as stated above.

Examples of diazo components of the aforesaid general formula are inter alia:

2-amino-dibenzene-sulphonic acid-N-phenylimide
2-amino-dibenzene-sulphonic acid-N-2'-chlorophenylimide
2-amino-dibenzene-sulphonic acid-N-3'-chlorophenylimide
2-amino-dibenzene-sulphonic acid-N-4'-chlorophenylimide
2-amino-dibenzene-sulphonic acid-N-2'-methylphenylimide
2-amino-dibenzene-sulphonic acid-N-4'-methylphenylimide
2-amino-dibenzene-sulphonic acid-N-2'-isopropylphenylimide
2-amino-dibenzene-sulphonic acid-N-α-naphthylimide
2-amino-dibenzene-sulphonic acid-N-3',4'-dichlorophenylimide
2-amino-dibenzene-sulphonic acid-N-2'-phenoxyphenylimide
2-amino-dibenzene-sulphonic acid-N-2'-benzene-sulphonyl-hydroxy-phenylimide
2-amino-dibenzene-sulphonic acid-N-4'-benzene-sulphonyl-hydroxy-phenylimide
2-amino-dibenzene-sulphonic acid-N-cyclohexylimide
2-amino-dibenzene-sulphonic acid-N-2'-methyl-cyclohexylimide
2-amino-dibenzene-sulphonic acid-N-1'-aliphatic tetrahydronaphthylimide
2-amino-4'-chloro-dibenzene-sulphonic acid-N-phenylimide
2-amino-4'-chloro-dibenzene-sulphonic acid-N-4''-chlorophenylimide
2-amino-4'-methyl-dibenzene-sulphonic acid-N-phenylimide.

The aforesaid amines may be obtained according to known methods, for example by the reaction of 2-nitro-benzene-sulphonic acid anilide with benzene-sulphonic acid chloride in an aqueous alkaline solution and catalytic hydrogenation of the nitro group to form 2-amino-benzene-sulphonic acid-N-phenyl - N - benzenesulfonyl imide. Diazotisation of the amines may be effected in conventional manner, optionally by simultaneously using surface-active substances or organic solvents such as glacial acetic acid or formamide.

As suitable coupling components there may be mentioned inter alia: 2-amino-8-hydroxynaphthalene-6-sulphonic acid, 2-phenylamino-8-hydroxynaphthalene-6-sulphonic acid, 2-methylamino-8-hydroxynaphthalene-6-sulphonic acid and 2-benzylamino-8-hydroxynaphthalene-6-sulphonic acid. Coupling is preferably carried out in an aqueous acetic acid solution or suspension and organic solvents such as formamide or dimethyl formamide may also be used.

Red to bluish red dyestuffs are obtained which are suitable for the dyeing of wool and polyamide fibres from an acid bath. The dyeings are distinguished by good levelness and possess good fastness to light and wet processing.

The following examples are given for the purpose of illustrating the invention without, however, limiting it thereto.

Example 1

32.4 parts by weight of finely powdered 2-amino-benzene-sulphonic acid - N - phenyl - N - benzene sulfonyl imide are well stirred with 150 parts by volume of concentrated hydrochloric acid and 150 parts by volume of water, and diazotised at 5–10° C. with a solution of 7.0 parts by weight of sodium nitrite in 20 parts by volume of water. The suspension of the diazo compound is subsequently introduced into a solution of 24.0 parts by weight of 2-amino-8-hydroxynaphthalene-6-sulphonic acid in 200 parts by volume of formamide and stirred until coupling is completed. The mixture is then heated to 80° C. with steam, the dyestuff completely separated by the addition of a saturated common salt solution, filtered off and dried. The dyestuff readily dissolves in water and dyes wool and polyamide fibres from an acetic acid bath in level, bluish red shades of very good fastness to light and good fastness to wet processing.

In an analogous manner, the dyestuffs may be obtained from the diazo and coupling components shown in the following table:

| Diazo component | | Coupling component | Shade of the dyeing on wool |
|---|---|---|---|

Diazo component general structure:

$$\text{(phenyl with } NH_2\text{)}-SO_2-N(X)-SO_2-\text{(phenyl-Y)}$$

| X | Y | Coupling component | Shade of the dyeing on wool |
|---|---|---|---|
| 4-Cl-phenyl | H | 2-amino-8-hydroxy-naphthalene-6-sulphonic acid. | Bluish red. |
| 3-Cl-phenyl | H | ...do... | Do. |
| 2-Cl-phenyl | H | ...do... | Do. |
| 4-CH₃-phenyl | H | ...do... | Do. |
| 3-CH₃-phenyl | H | ...do... | Do. |
| 2-CH(CH₃)₂-phenyl | H | ...do... | Do. |
| naphthyl | H | ...do... | Do. |
| 3,4-di-Cl-phenyl | H | ...do... | Do. |
| 4-O-C₆H₅-phenyl | H | ...do... | Do. |
| 2-O-SO₂-C₆H₅-phenyl | H | ...do... | Do. |
| 4-O-SO₂-C₆H₅-phenyl | H | ...do... | Do. |
| phenyl (H) | H | ...do... | Red. |
| 4-CH₃-phenyl (H on other ring) | H | ...do... | Do. |
| phenyl | —Cl (in p-position) | ...do... | Bluish red. |
| 4-Cl-phenyl | —Cl (in p-position) | ...do... | Do. |
| phenyl | —CH₃ (in p-position) | ...do... | Do. |
| phenyl | H | 2-butylamino-8-hydroxy-naphthalene-6-sulphonic acid. | Do. |
| phenyl | —NH—CO—CH₂Cl (in p-position) | 2-amino-8-hydroxynaphthalene-6-sulphonic acid. | Do. |
| phenyl | H | 2-phenylamino-8-hydroxy-naphthalene-6-sulphonic acid. | Bordeau. |
| phenyl | H | 2-methylamino-8-hydroxy-naphthalene-6-sulphonic acid. | Bluish red. |

Example 2

140 parts by weight of 2-nitrobenzene-sulphonic acid anilide are dissolved in 1000 parts by volume of water containing 30 parts by volume of a 45% sodium hydroxide solution, and 200 parts by volume of a 15% sodium carbonate solution are then added. 97 parts by weight of benzene-sulphonic acid chloride are added dropwise at 40–50° C. with stirring. The precipitated 2-nitro-benzene-sulphonic acid-N-phenyl-N-benzenesulfonyl imide is filtered off with suction, washed with water and dried. After re-crystallisation from acetone, the compound melts at 118–119° C. For reduction the 150 parts by weight of nitro compound thus obtained are dissolved in 600 parts by volume of methanol, 20 parts by weight of Raney nickel are added, and hydrogen at 60 atmospheres is introduced at 50–60° C. into an autoclave until no further reduction of pressure occurs. After cooling and releasing the pressure the catalyst is filtered off and the 2-amino-benzene-sulphonic acid-N-phenyl-N-benzenesulfonyl imide is crystallized by concentration of the reaction filtrate.

We claim:
1. An azo dyestuff of the formula

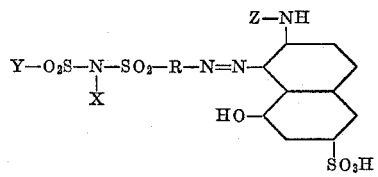

wherein R stands for phenylene bearing the azo and —$SO_2$ group in adjacent position; X is a member selected from the class consisting of phenyl, monochloro-substituted phenyl, 3,4-dichloro-substituted phenyl, 2-lower alkyl-substituted phenyl, 4-lower alkyl-substituted phenyl, 2-phenoxy-substituted phenyl, 2-phenyl sulfonyloxy, 4-phenyl sulfonyloxy, α-naphthyl, cyclohexyl, 2-methyl-substituted cyclohexyl and aliphatic tetra-hydronaphthyl; Y stands for mononuclear carbocyclic aryl; and Z is a member selected from the class consisting of hydrogen, lower alkyl, phenyl and benzyl.

2. The dyestuff of the formula

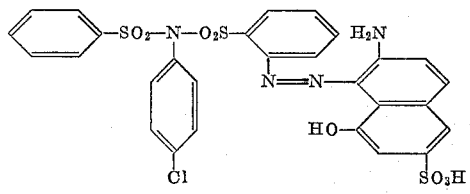

3. The dyestuff of the formula

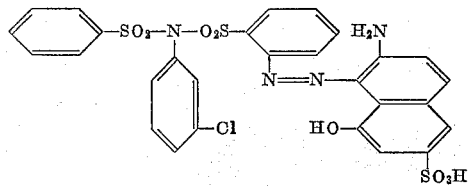

4. The dyestuff of the formula

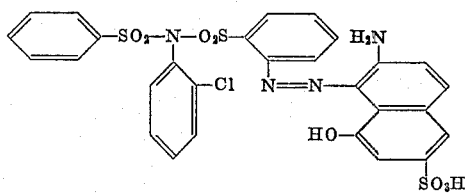

5. The dyestuff of the formula

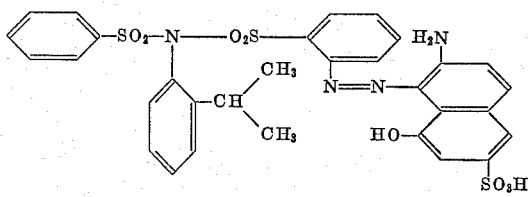

6. The dyestuff of the formula

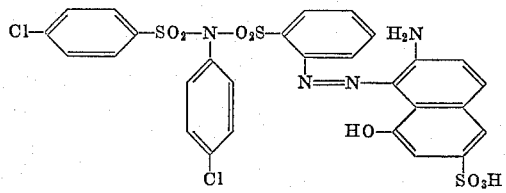

7. The dyestuff of the formula

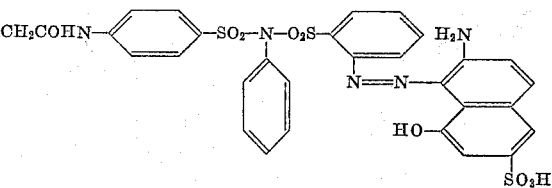

8. The dyestuff of the formula

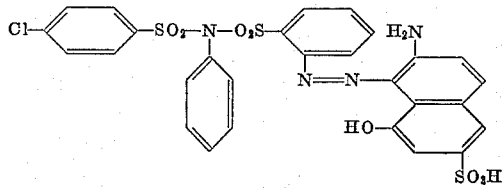

References Cited in the file of this patent

Exner: German application Ser. No. F 18237, printed Dec. 20, 1956.